United States Patent
Aramaki et al.

(10) Patent No.: US 9,046,352 B2
(45) Date of Patent: Jun. 2, 2015

(54) ELECTRODE POSITION DETECTION DEVICE AND ELECTRODE POSITION DETECTION METHOD

(75) Inventors: Isao Aramaki, Machida (JP); Yoshitaka Usui, Zushi (JP); Katsuhide Nagahashi, Yokohama (JP); Yutaka Suzuki, Ebina (JP); Keisuke Noda, Hirakata (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 65 days.

(21) Appl. No.: 14/009,461

(22) PCT Filed: Apr. 6, 2012

(86) PCT No.: PCT/JP2012/059511
§ 371 (c)(1),
(2), (4) Date: Oct. 2, 2013

(87) PCT Pub. No.: WO2012/137920
PCT Pub. Date: Oct. 11, 2012

(65) Prior Publication Data
US 2014/0027643 A1    Jan. 30, 2014

(30) Foreign Application Priority Data

Apr. 7, 2011   (JP) ................................ 2011-085791
Mar. 23, 2012  (JP) ................................ 2012-067852

(51) Int. Cl.
| | |
|---|---|
| *G01N 21/3563* | (2014.01) |
| *G01B 11/14* | (2006.01) |
| *G01B 11/00* | (2006.01) |
| *H01M 2/18* | (2006.01) |
| *H01M 4/04* | (2006.01) |
| *H01M 4/139* | (2010.01) |
| *H01M 10/04* | (2006.01) |
| *H01M 10/0525* | (2010.01) |
| *H01M 10/058* | (2010.01) |

(52) U.S. Cl.
CPC ............. *G01B 11/14* (2013.01); *G01B 11/002* (2013.01); *H01M 2/18* (2013.01); *H01M 4/04* (2013.01); *H01M 4/139* (2013.01); *H01M 10/0404* (2013.01); *H01M 10/0525* (2013.01); *H01M 10/058* (2013.01); *Y02E 60/122* (2013.01)

(58) Field of Classification Search
CPC .................................................. G01N 21/3563
USPC ........................................................ 250/341.8
See application file for complete search history.

(56) References Cited

U.S. PATENT DOCUMENTS

| | | | |
|---|---|---|---|
| 8,338,033 | B2 | 12/2012 | Shimizu et al. |
| 2010/0281685 | A1 | 11/2010 | Hori et al. |

FOREIGN PATENT DOCUMENTS

| | | | |
|---|---|---|---|
| JP | 8-180852 | A | 7/1996 |
| JP | 9-92256 | A | 4/1997 |
| JP | 3380935 | B2 | 2/2003 |
| JP | 2010-257861 | A | 11/2010 |
| JP | 2011-40179 | A | 2/2011 |
| JP | 2012-9210 | A | 1/2012 |
| WO | WO 2009/087859 | A1 | 7/2009 |

*Primary Examiner* — David Porta
*Assistant Examiner* — Hugh H Maupin
(74) *Attorney, Agent, or Firm* — Foley & Lardner LLP

(57) ABSTRACT

An electrode position detection device detects a relative positional relationship between a positive electrode and a negative electrode, when a packaged electrode having the positive electrode disposed inside a bag-shaped separator and the negative electrode are alternately stacked. The device includes a light source, a camera, and a detector. The light source projects light that penetrates the separator and is reflected by the electrodes. The camera receives the light reflected by the positive electrode when the packaged positive electrode is on the uppermost layer and receives the light reflected by the negative electrode when the negative electrode is on the uppermost layer. The detector detects the relative positional relationship between the electrodes based on the results of light reception by the camera when the packaged positive electrode is on the uppermost layer and the results of light reception by the camera when the negative electrode is on the uppermost layer.

8 Claims, 16 Drawing Sheets

(A)

(B)

(A)

(B)

(C)

(D)

(E)

(F)

ELECTRODE POSITION DETECTION DEVICE AND ELECTRODE POSITION DETECTION METHOD

TECHNICAL FIELD

The present invention relates to an electrode position detection device and an electrode position detection method.

BACKGROUND ART

In recent years, secondary batteries have been used in various products. The secondary battery includes a battery element in which positive electrodes, separators and negative electrodes are stacked. It is important that, in the battery element, the positive electrodes and the negative electrodes are stacked with the separators interposed therebetween without being displaced. A displacement in stacking causes deterioration in battery performance or battery life.

To avoid such displacement of the positive electrode and the negative electrode, there has been proposed a technique in which a packaged positive electrode and a negative electrode are stacked, the packaged positive electrode being obtained by previously forming two separators in a bag shape and disposing a positive electrode in the bag, thus realizing quick and accurate stacking of the positive and negative electrodes (see Patent Literature 1). According to Patent Literature 1, positioning and stacking of the negative electrode and the separators also enables accurate positioning between the negative electrode and the positive electrode inside the separators. In this technique, the separators and the negative electrode are formed to have approximately the same size, and stacking thereof while aligning outlines thereof enables alignment between the negative electrode and the positive electrode inside the separators.

CITATION LIST

Patent Literature

Patent Literature 1: Japanese Patent No. 3380935

SUMMARY OF INVENTION

Technical Problem

However, Patent Literature 1 describes alignment between the outlines of the separators and the negative electrode, but does not describe a specific method for the alignment. It is difficult in the first place to align the outlines, and if the outlines cannot be aligned successfully, there is no guarantee that the positive electrode and the negative electrode are accurately aligned and stacked.

Also, in the invention described in Patent Literature 1, alignment between the positive electrode and the negative electrode cannot be guaranteed when the bag-shaped separators and the negative electrode are different in size.

The present invention was made in consideration of the foregoing circumstances. It is an object of the present invention to provide an electrode position detection device and an electrode position detection method, which can detect positions of a packaged electrode and another electrode in stacking thereof.

Solution to Problem

A first aspect of the present invention is an electrode position detection device configured to detect a relative positional relationship between a first electrode and a second electrode when a packaged electrode and the second electrode are alternately stacked, the packaged electrode having the first electrode disposed inside a separator formed in a bag shape, the second electrode having a polarity different from that of the first electrode. The electrode position detection device includes a projector, a light receiver and a detector. The projector is configured to project light that penetrates the separator and is reflected by the first and second electrodes. The light receiver is configured to receive light reflected by the first electrode when the packaged electrode is positioned in the uppermost layer, and to receive light reflected by the second electrode when the second electrode is positioned in the uppermost layer. The detector is configured to detect the relative positional relationship between the first and second electrodes based on the result of the light reception by the light receiver when the packaged electrode is positioned in the uppermost layer and the result of the light reception by the light receiver when the second electrode is positioned in the uppermost layer.

A second aspect of the present invention is an electrode position detection method for detecting a relative positional relationship between a first electrode and a second electrode when a packaged electrode and the second electrode are alternately stacked, the packaged electrode having the first electrode disposed inside a separator formed in a bag shape, the second electrode having a polarity different from that of the first electrode. The electrode position detection method includes a projection step, a light reception step and a detection step. In the projection step, light that penetrates the separator and is reflected by the first and second electrodes is projected. In the light reception step, light reflected by the first electrode is received when the packaged electrode is positioned in the uppermost layer, and light reflected by the second electrode is received when the second electrode is positioned in the uppermost layer. In the detection step, the relative positional relationship between the first and second electrodes is detected based on the result of the light reception by the light receiver when the packaged electrode is positioned in the uppermost layer and the result of the light reception by the light receiver when the second electrode is positioned in the uppermost layer.

DESCRIPTION OF EMBODIMENTS

Figure 1:
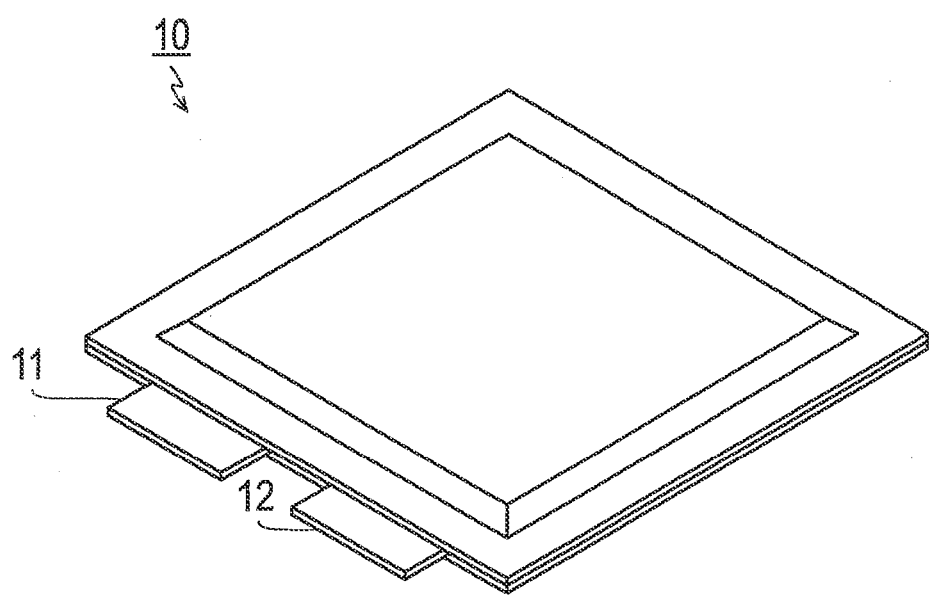
FIG. 1 is a perspective view showing an external appearance of a lithium-ion secondary battery.

With reference to the accompanying drawings, embodiments of the present invention will be described below. Note that dimensional ratios in the drawings are exaggerated for convenience of explanation, and may be different from the actual ratios.

The present invention relates to an electrode position detection device applied to a part of the process for manufacturing a secondary battery. Prior to describing the electrode position detection device that is one embodiment of the present invention, a structure of a battery and a sheet stacking device configured to assemble a power generation element of the battery will be described.

(Battery)

Figure 2:
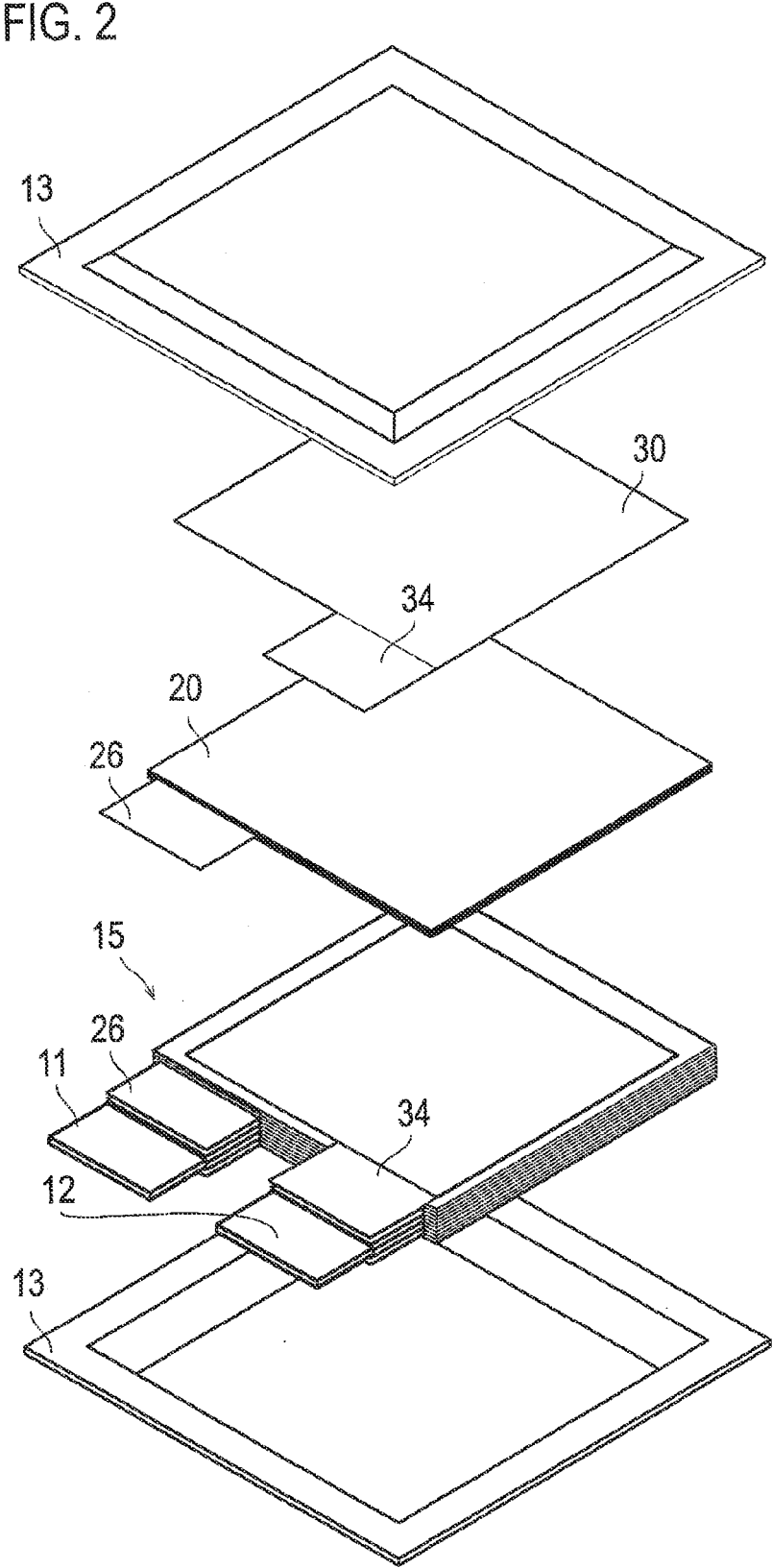
FIG. 2 is an exploded perspective view of the lithium-ion secondary battery.
Figure 3:
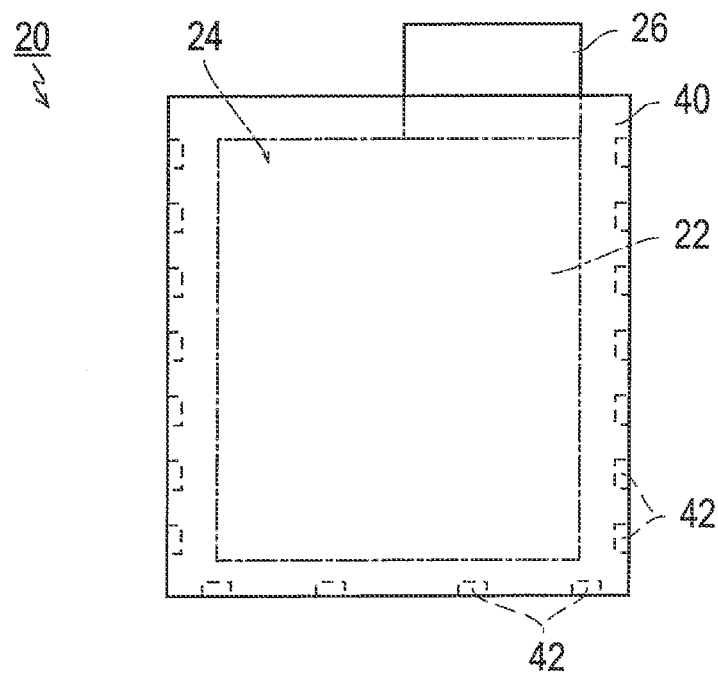
FIG. 3 is a plan view of a negative electrode and a packaged positive electrode.
Figure 3:
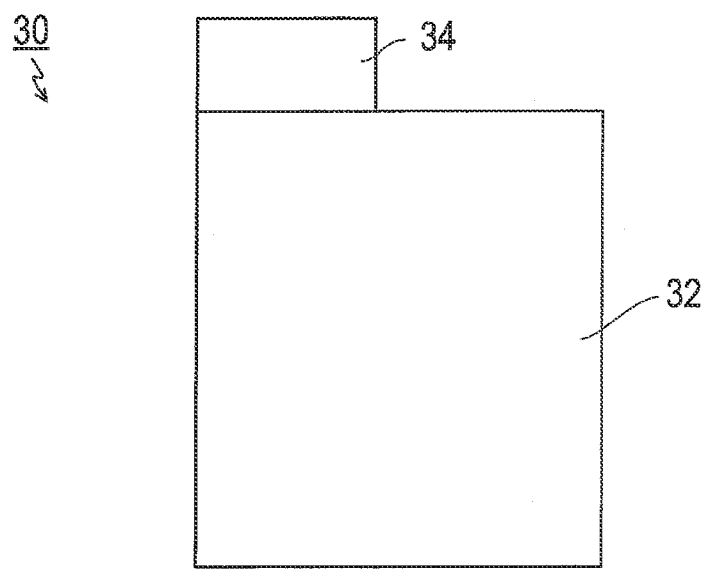
Figure 4:
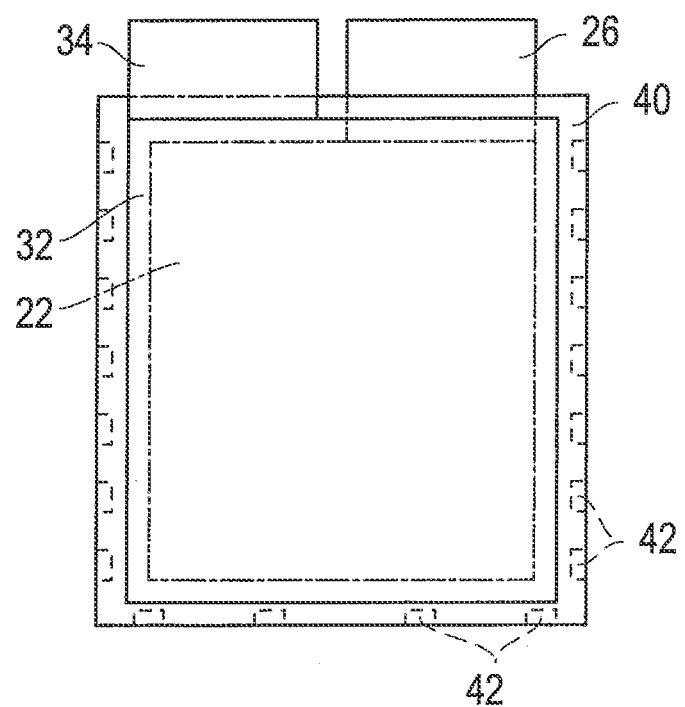
FIG. 4 is a plan view showing a state where the negative electrode is stacked on the packaged positive electrode.

First, with reference to FIG. 1, a lithium-ion secondary battery (laminate battery) will be described, which is formed by the sheet stacking device. FIG. 1 is a perspective view showing an external appearance of the lithium-ion secondary battery. FIG. 2 is an exploded perspective view of the lithium-ion secondary battery. FIG. 3 is a plan view of a negative electrode and a packaged positive electrode. FIG. 4 is a plan view showing a state where the negative electrode is stacked on the packaged positive electrode.

As shown in FIG. 1, a lithium-ion secondary battery 10 has a flat rectangular shape, including a positive-electrode lead 11 and a negative-electrode lead 12 which are extended from the same end of an exterior member 13. A power generation element (battery element) 15, in which a charge and discharge reaction occurs, is housed in the exterior member 13. As shown in FIG. 2, the power generation element 15 is formed by stacking packaged positive electrodes 20 and negative electrodes 30 are alternately stacked in a stacking direction.

As shown in FIG. 3(A), the packaged positive electrode 20 is formed by sandwiching a positive electrode 24 between separators 40. The positive electrode 24 is obtained by forming positive electrode active material layers 22 on both sides of a sheet-shaped positive electrode collector. Two separators 40 are joined together by joint portions 42 at end portions thereof and thus formed into a bag shape. The positive electrode 24 has a tab portion 26 drawn out of the bag of the separators 40. The positive electrode 24 has the positive electrode active material layers 22 formed in a portion other than the tab portion 26.

As shown in FIG. 3(B), the negative electrode 30 is obtained by forming a negative electrode active material layers 32 formed on both sides of a very thin sheet-shaped negative electrode collector. The negative electrode 30 has the negative electrode active material layers 32 formed in a portion other than a tab portion 34.

FIG. 4 shows a state where the negative electrode 30 is stacked on the packaged positive electrode 20. As shown in FIG. 4, the negative electrode active material layer 32 is formed to be slightly larger than the positive electrode active material layer 22 of the positive electrode 24 in a plan view.

Note that a method itself for manufacturing the lithium-ion secondary battery by alternately stacking the packaged positive electrodes 20 and the negative electrodes 30 is a common method for manufacturing a lithium-ion secondary battery, and thus detailed description thereof will be omitted.

(Sheet Stacking Device)

Next, the sheet stacking device to assemble the power generation element 15 will be described.

Figure 5:
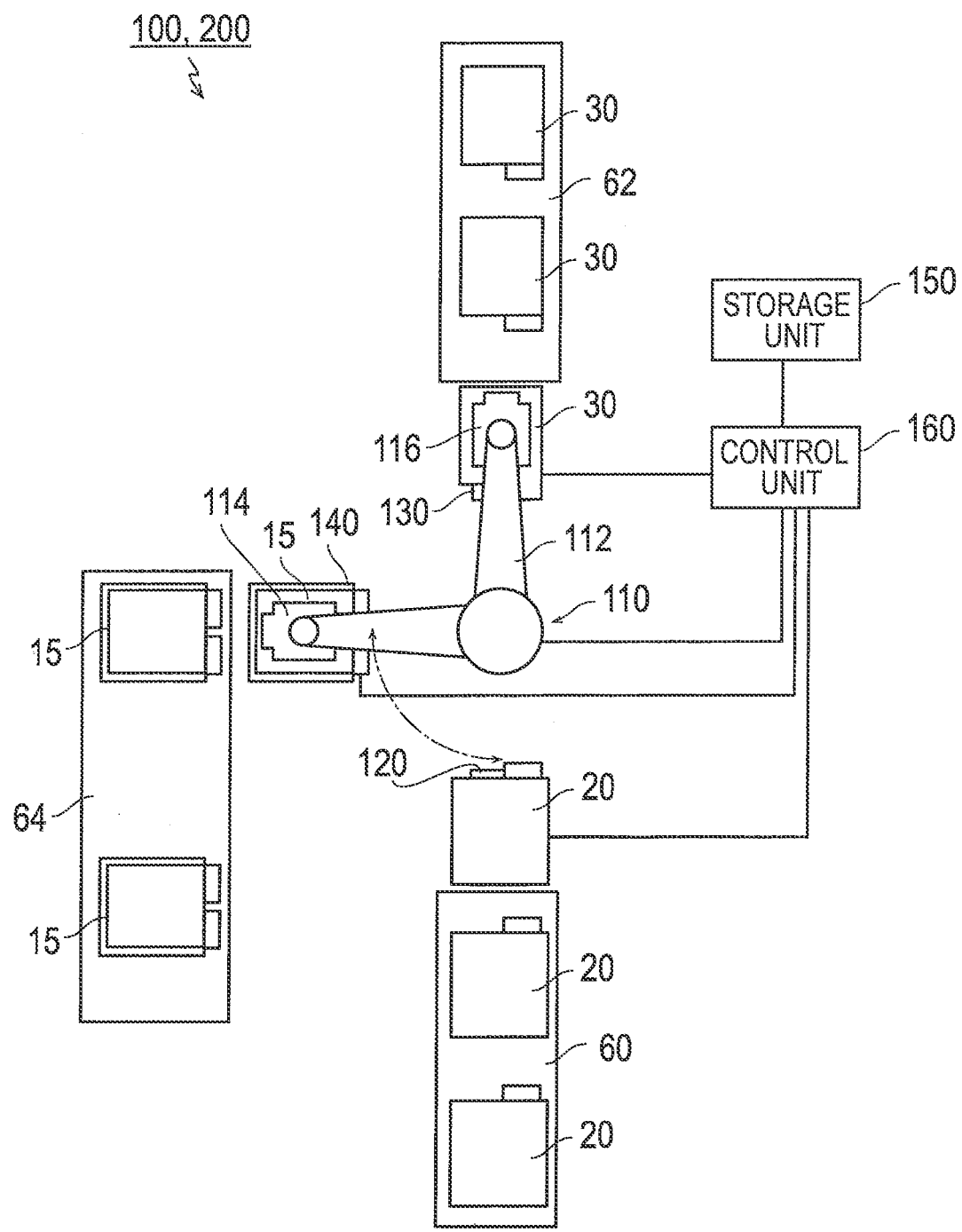
FIG. 5 is a schematic plan view showing a sheet stacking device.
Figure 6:
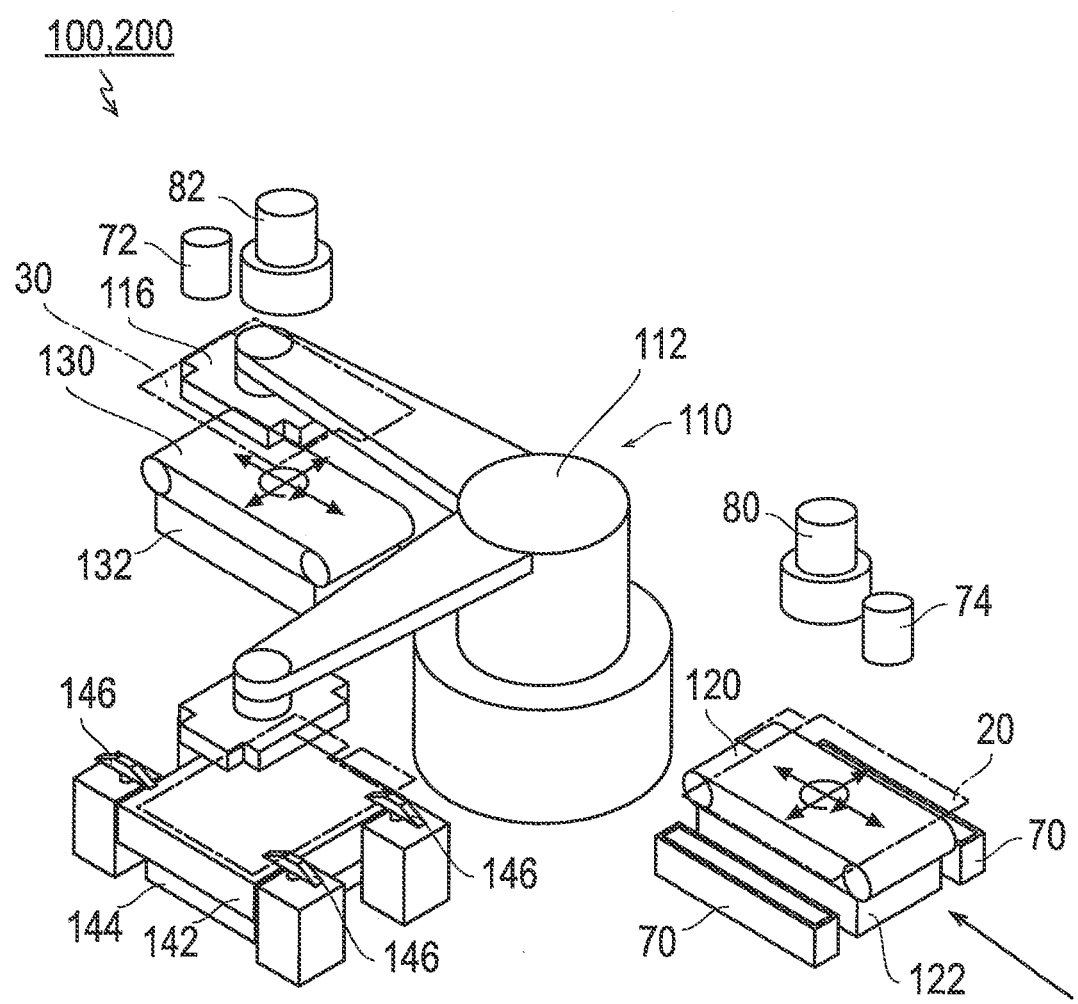
FIG. 6 is a perspective view showing the sheet stacking device.
Figure 7:
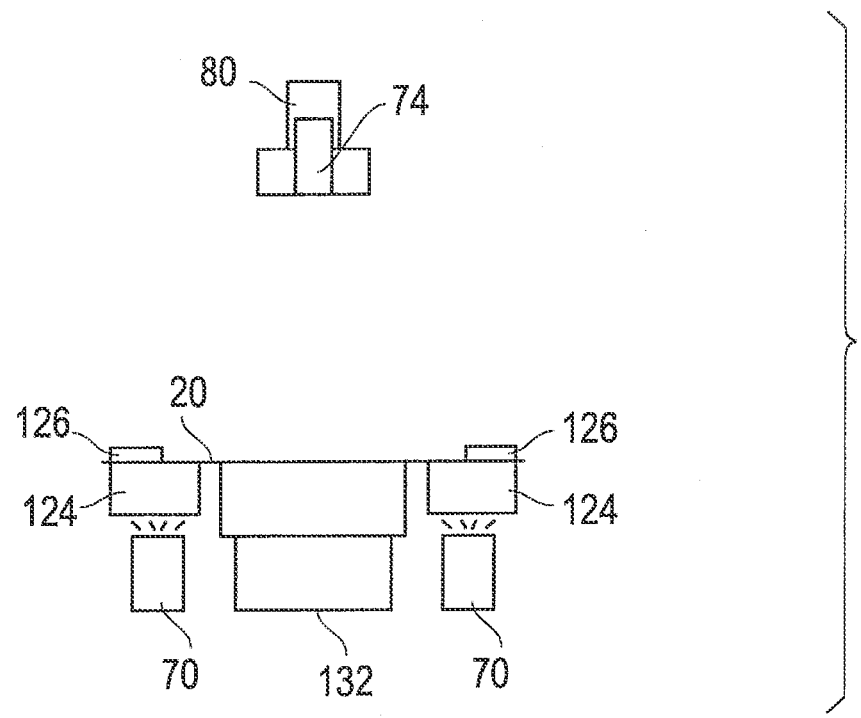
FIG. 7 is a front view of a positive electrode feed table seen from the arrow direction in FIG. 6.
Figure 8:
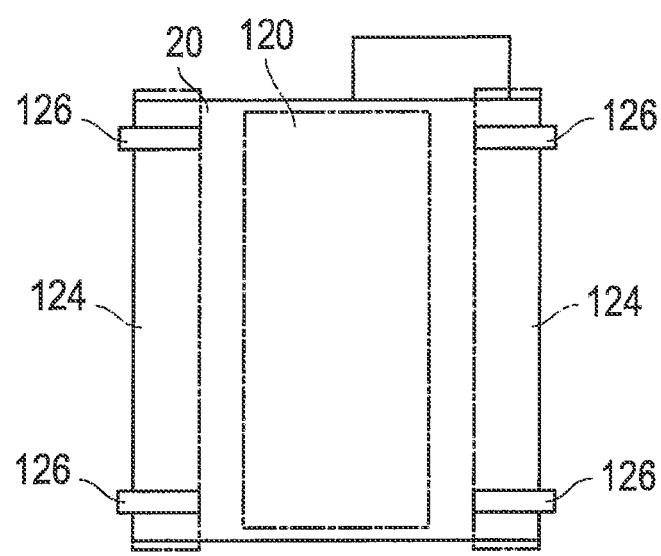
FIG. 8 is a plan view of the positive electrode feed table.

FIG. 5 is a schematic plan view showing the sheet stacking device. FIG. 6 is a perspective view showing the sheet stacking device. FIG. 7 is a front view of a positive electrode feed table seen from the arrow direction in FIG. 6. FIG. 8 is a plan view of the positive electrode feed table.

As shown in FIGS. 5 and 6, a sheet stacking device 100 includes a stacking robot 110, a positive electrode feed table 120, a negative electrode feed table 130, a stacking stage 140, a storage unit 150 and a control unit 160. The stacking robot 110, the positive electrode feed table 120, the negative electrode feed table 130 and the stacking stage 140 are controlled by the control unit 160. Also, control programs and various data for the control unit 160 are stored in the storage unit 150.

The stacking robot 110 forms the power generation element (stacked body) 15 by alternately stacking the packaged positive electrodes 20 and the negative electrodes 30. The stacking robot 110 has an L-shaped arm 112 and first and second suction hands 114 and 116 provided at ends of the L-shaped arm 112. The L-shaped arm 112 is rotated by a predetermined angle in a horizontal direction, e.g., by 90 degrees in this embodiment. Also, the L-shaped arm 112 can be moved by a predetermined amount in a vertical direction. The first suction hand 114 is provided at one end of the L-shaped arm 112 to hold the packaged positive electrode 20 by suction or release the packaged positive electrode 20. The second suction hand 116 is provided at the other end of the L-shaped arm 112 to hold the negative electrode 30 by suction or release the negative electrode 30.

The positive electrode feed table 120 is a table to hand over the packaged positive electrode 20 to the L-shaped arm 112. The positive electrode feed table 120 receives and places the packaged positive electrodes 20 one by one, which are formed in a previous process and conveyed by a suction conveyor 60. The positive electrode feed table 120 is also a suction conveyor, which holds the packaged positive electrode 20 by suction, which is released from a negative pressure of the suction conveyor 60, conveys the electrode to approximately the center, and fixes the electrode with a negative pressure. Also, the positive electrode feed table 120 can be moved and rotated in a planar direction so as to enable adjustment of a plan position of the packaged positive electrode 20. The positive electrode feed table 120 is provided on an XY stage 122, for example. The plan position is adjusted by moving the XY stage 122 in an X or Y direction or by rotating the XY stage 122 in the planar direction. The XY stage 122 is moved and rotated in the planar direction by three motors.

The positive electrode feed table 120 is configured to be narrower than the suction conveyor 60 so that the sides of the packaged positive electrode 20 stick out of the table. Although not shown in FIGS. 5 and 6, transparent supporting stages 124 are provided on both sides of the positive electrode feed table 120 as shown in FIGS. 7 and 8. Each of the supporting stages 124 supports the end portion of the packaged positive electrode 20, which sticks out of the positive electrode feed table 120. In addition, clampers 126 are provided at positions corresponding to the supporting stages 124. Each of the clampers 126 fixes the packaged positive electrode 20 by sandwiching the end portion thereof with the supporting stage 124. The supporting stage 124 and the clamper 126 are both movable, and approach the packaged positive electrode 20 so as to support and fix the end portion of the packaged positive electrode 20 when the packaged positive electrode 20 is placed on the positive electrode feed table 120.

Moreover, a light source 70 is provided below the positive electrode feed table 120 and a camera 80 is provided above the positive electrode feed table 120. The light source 70 is installed below the transparent supporting stage 124 to irradiate light to the end portion of the packaged positive electrode 20. The light to be irradiated is light of a wavelength that penetrates the separator 40 at a predetermined transmission rate or more and is reflected by the positive electrode 24. The camera 80 takes an image of the position of the positive electrode 24 by receiving light projected from the light source 70 and transmitted through the separator 40 while being blocked by the positive electrode 24. In other words, the camera takes an image of the position of the positive electrode 24 based on the shadow of the positive electrode 24. Based on the position of the positive electrode 24 whose image has been taken by the camera 80, the horizontal position of the positive electrode 24 (the packaged positive electrode 20) is adjusted. This adjustment enables the suction hand 114 to pick up the packaged positive electrode 20 every time, in which the position of the positive electrode 24 is accurately positioned.

Furthermore, a light source 74 is also installed above the positive electrode feed table 120. The light source 74 irradiates light to the packaged positive electrode 20. The light to be irradiated is light of a wavelength that is reflected by the separator 40. The camera 80 takes an image of the position of the separator 40 by receiving light reflected by the separator 40. The position of the separator 40 whose image has been taken is compared with the position of the positive electrode 24, thus determining the position of the positive electrode 24 inside the separators 40.

Referring back to FIGS. 5 and 6, the negative electrode feed table 130 is a table to hand over the negative electrode 30 to the L-shaped arm 112. The negative electrode feed table 130 receives and places the negative electrodes 30 one by one, which are formed in a previous process and conveyed by a suction conveyor 62. The negative electrode feed table 130 is also a suction conveyor, which holds the negative electrode 30 by suction, which is released from a negative pressure of the suction conveyor 62, conveys the electrode to approximately the center, and fixes the electrode with a negative pressure. When the negative electrode 30 is held by the second suction hand 116 by suction, the negative electrode feed table 130 releases the suction. Also, the negative electrode feed table 130 can be moved and rotated in the planar direction so as to enable adjustment of a plan position of the negative electrode 30. The negative electrode feed table 130 is provided on an XY stage 132, for example. The plan position is adjusted by moving the XY stage 132 in the X or Y direction or by rotating the XY stage 132 in the planar direction. The XY stage 132 is moved and rotated in the planar direction by three motors.

Also, a light source 72 and a camera 82 are provided above the negative electrode feed table 130. The light source 72 irradiates light to the negative electrode 30, the light of a wavelength that is reflected by the negative electrode 30. The camera 82 takes an image of the position of the negative electrode 30 by receiving light projected from the light source 72 and reflected by the negative electrode 30. The negative electrode feed table 130 adjusts the horizontal position of the negative electrode 30 based on the position of the negative electrode 30 whose image has been taken by the camera 82. This adjustment enables the suction hand 116 to pick up the accurately positioned negative electrode every time.

The stacking stage 140 includes a mounting part 142 to mount a palette on which the packaged positive electrodes 20 and the negative electrodes 30 are alternately stacked, a drive part 144 to move the mounting part 142 up and down, and four clampers 146 disposed in the periphery of the mounting part 142.

The mounting part 142 holds the stacked body 15 until the power generation element 15 is completed by stacking a predetermined number of packaged positive electrodes 20 and negative electrodes 30, and upon completion thereof, sends out the power generation element 15 onto a conveyor 64. The drive part 144 adjusts the height of the mounting part 142. To be more specific, the drive part 144 lowers the position of the mounting part 142 in accordance with the progress of the stacking so as not to change the height of the uppermost surface of the stacked body 15 even when the height of the stacked body 15 is changed as the packaged positive electrodes 20 and the negative electrodes 30 are alternately stacked. Thus, the stacking robot 110 can perform the stacking of the power generation element 15 just by repeating the same operation regardless of the progress of the stacking. The clampers 146 fix four corners of the stacked body 15 every time the negative electrode 30 or the packaged positive electrode 20 is stacked, so as to avoid displacement in the stacked body 15. Since the height of the mounting part 142 is adjusted to be lowered in accordance with the progress of the stacking, the clampers 146 can also repeat clamping with the same stroke each time.

(Stacking Operation)

Figure 9:
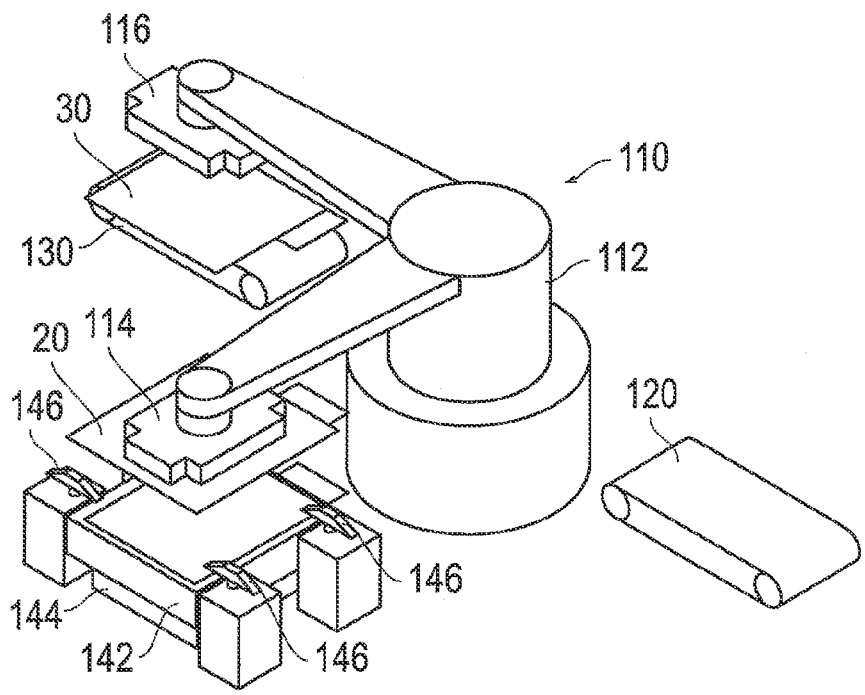
FIG. 9 is a view for explaining an operation of stacking the negative electrode and the packaged positive electrode by a stacking robot.
Figure 9:
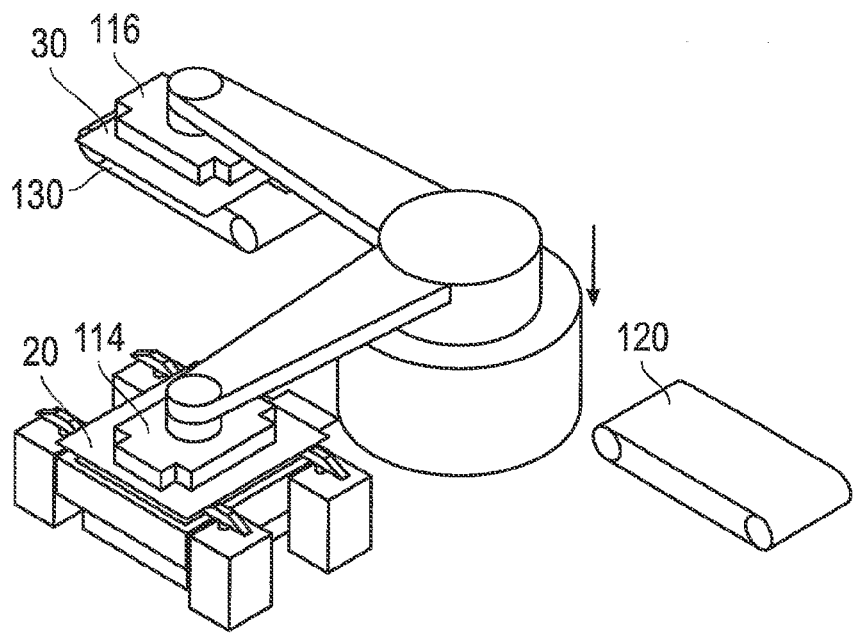
Figure 10:
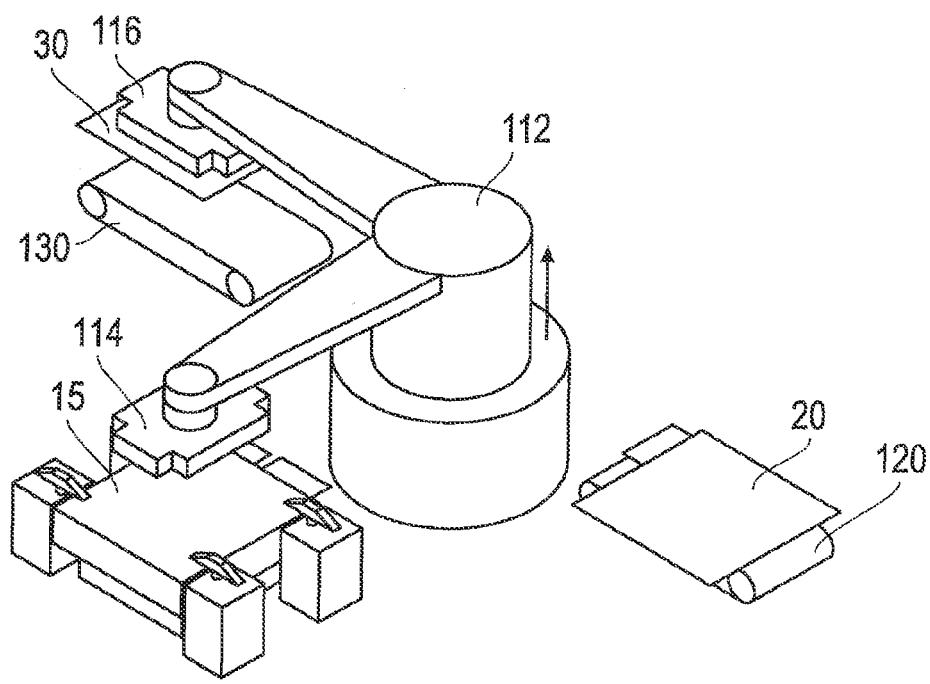
FIG. 10 is a view for explaining the operation of stacking the negative electrode and the packaged positive electrode by the stacking robot.
Figure 10:
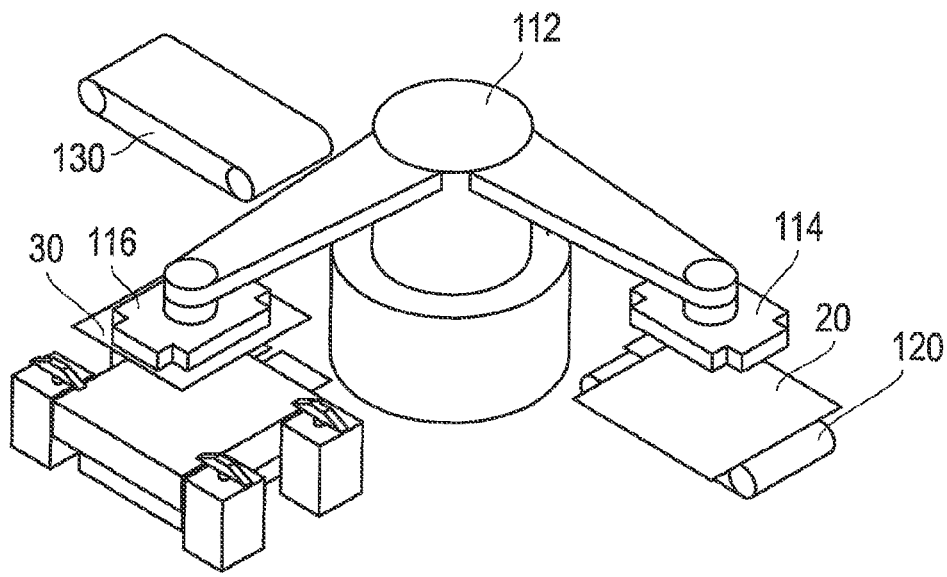
Figure 11:
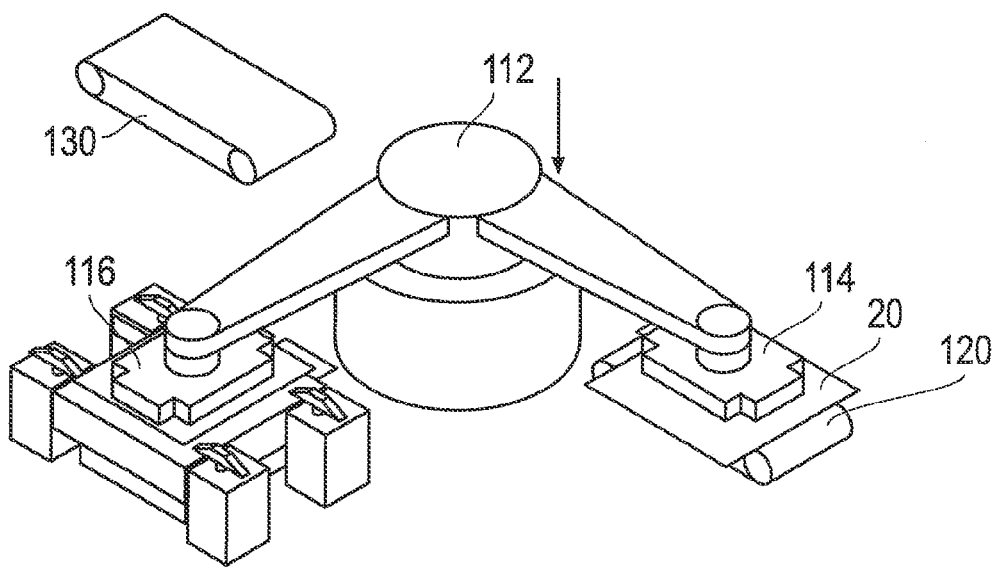
FIG. 11 is a view for explaining the operation of stacking the negative electrode and the packaged positive electrode by the stacking robot.
Figure 11:
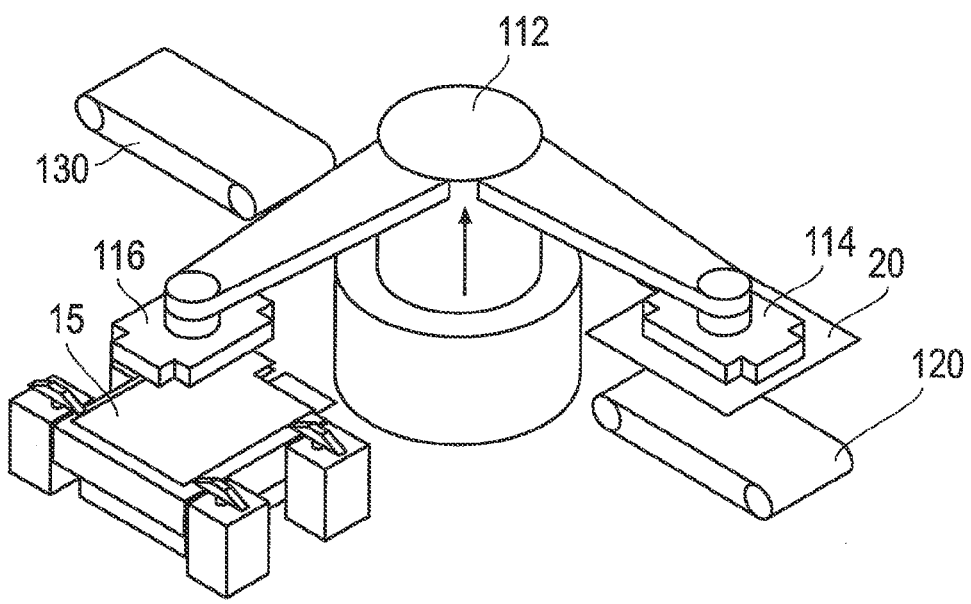

In the sheet stacking device 100 thus configured, the packaged positive electrodes 20 and the negative electrodes 30, which are mounted with their positions adjusted on the positive electrode feed table 120 and the negative electrode feed table 130, are picked up by the stacking robot 110 and alternately provided onto the stacking stage 140. With reference to FIGS. 9 to 11, a stacking operation by the sheet stacking device 100 will be described below.

FIGS. 9 to 11 are views for explaining an operation of stacking the negative electrodes and the packaged positive electrodes by the stacking robot. Note that the following description begins with an operation of stacking the packaged positive electrode 20 on the stacking stage 140 by the stacking robot 110.

As shown in FIG. 9(A), the packaged positive electrode 20 and the negative electrode 30 are mounted on the stacking stage 140, and the suction hand 114 is located above the stacking stage 140. The negative electrode 30 is disposed in the uppermost layer of the stacked body of the packaged positive electrode 20 and the negative electrode 30, and the suction hand 114 holds the packaged positive electrode 20 by suction. Meanwhile, the suction hand 116 is located above the negative electrode feed table 130. The negative electrode 30 is mounted on the negative electrode feed table 130.

Then, the L-shaped arm 112 of the stacking robot 110 is lowered by a predetermined amount (see FIG. 9(B)). With the lowering of the L-shaped arm 112, the suction hands 116 and 114 are lowered onto the negative electrode feed table 130 and the stacking stage 140, respectively. In this event, a negative pressure acts on the bottom of the suction hand 116, and the suction hand 116 holds the negative electrode 30 by suction. Meanwhile, the negative pressure on the suction hand 114 is released, and thus the packaged positive electrode 20 is released.

Thereafter, the L-shaped arm 112 of the stacking robot 110 is raised by a predetermined amount (see FIG. 10(C)). With the raising of the L-shaped arm 112, the suction hand 116 picks up the negative electrode 30 from the table 120. Also, the suction hands 116 and 114 are moved above the negative electrode feed table 130 and the stacking stage 140, respectively.

Subsequently, the L-shaped arm 112 of the stacking robot 110 is rotated by a predetermined amount (see FIG. 10(D)). As the L-shaped arm 112 is rotated by 90 degrees in the horizontal direction, the suction hand 116 is positioned above the stacking stage 140 and the suction hand 114 is positioned above the table 130.

Then, the L-shaped arm 112 of the stacking robot 110 is lowered by a predetermined amount (see FIG. 11(E)). With the lowering of the L-shaped arm 112, the suction hands 116 and 114 reach the stacking stage 140 and the positive electrode feed table 120, respectively. In this event, the negative pressure on the suction hand 116 is released, and thus the suction hand 116 releases the negative electrode 30 on the uppermost surface of the stacked body on the stacking stage 140. Meanwhile, a negative pressure acts on the bottom of the suction hand 114, and thus the suction hand 114 holds the packaged positive electrode 20 on the table 120 by suction.

Thereafter, the L-shaped arm 112 of the stacking robot 110 is raised by a predetermined amount (see FIG. 11(F)). With the raising of the L-shaped arm 112, the suction hand 116 is moved above the stacking stage 140. Meanwhile, the suction hand 114 picks up the packaged positive electrode 20 from the table 120.

Subsequently, the L-shaped arm 112 of the stacking robot 110 is rotated by a predetermined amount. As the L-shaped arm 112 is rotated by −90 degrees in the horizontal direction, the suction hand 116 is positioned above the table 130 and the suction hand 114 is positioned above the stacking stage 140 (see FIG. 9(A)).

By repeating the above operations, the packaged positive electrodes 20 and the negative electrodes 30 are alternately stacked on the stacking stage 140. A predetermined number of the packaged positive electrodes 20 and the negative electrodes 30 are stacked to form a stacked body as the power generation element 15.

(Electrode Position Detection Device)

Next, description will be given of a configuration of an electrode position detection device 200 applied to the sheet stacking device 100 described above.

Figure 12:
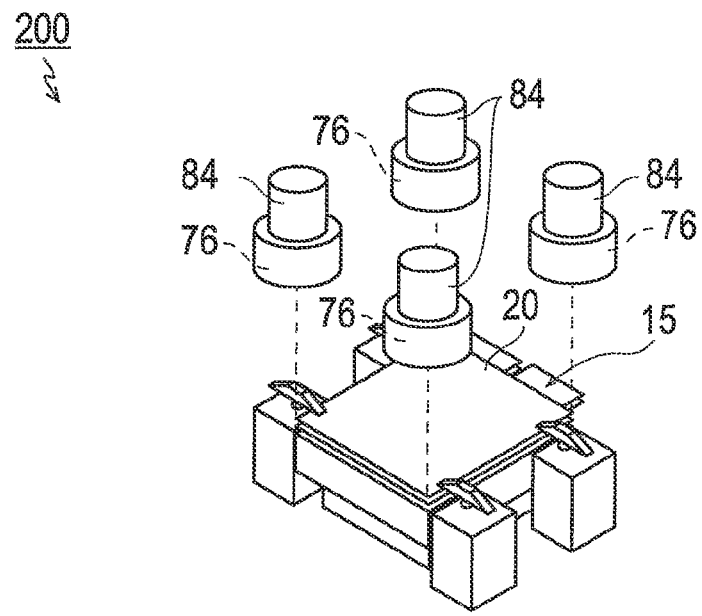
FIG. 12 is a view showing cameras above a stacking stage.
Figure 13:
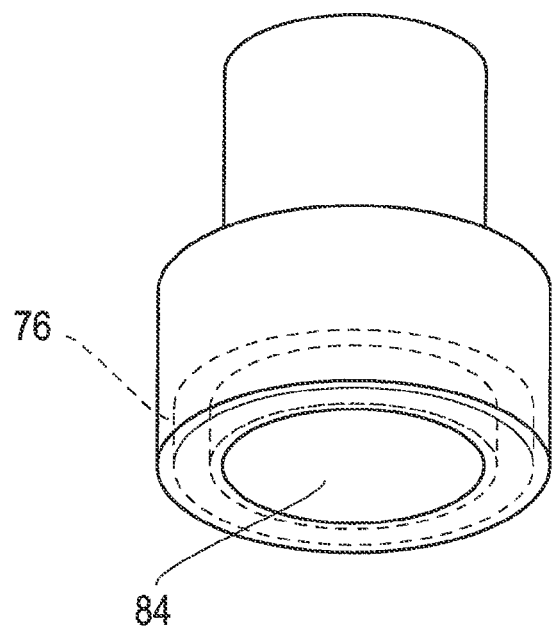
FIG. 13 is a view showing a structure of the camera.

FIG. 12 is a view showing cameras above the stacking stage, and FIG. 13 is a view showing a structure of the camera.

With reference to FIGS. 5, 12 and 13, the electrode position detection device 200 will be described.

The electrode position detection device 200 includes light sources 76, cameras 84 and a control unit 160. Although not shown in FIG. 6, the light sources 76 and the cameras 84 are installed above the stacking stage 140. The light sources 76 and the cameras 84 are connected to the control unit 160, and operations thereof are controlled by the control unit 160.

Each of the light sources 76 is disposed above the stacking stage 140 as a projector. The light source 76 projects light of a wavelength that penetrates the separator 40 and is reflected by the positive electrode 24 and the negative electrode 30, e.g., near-infrared light toward the packaged positive electrode 20 or the negative electrode 30 placed in the uppermost layer of the stacked body 15. Note that it is known that the longer the wavelength of the light, the higher the transmission rate. However, the transmission rate varies with the material. The wavelength of the light to be projected needs to be set as appropriate according to the material of the separator 40. How to set the wavelength of the light to be projected will be described in detail later.

In this embodiment, the light source 76 is provided in a ring shape around the camera 84 as shown in FIG. 13. The light sources 76 projects light at least toward four corners of the corresponding positive electrode 24 (the packaged positive electrode 20) or the negative electrode 30.

As shown in FIG. 12, the cameras 84 are disposed above the stacking stage 140 as light receivers, and take images of the power generation element 15 formed on the stacking stage 140 from directly above in the stacking direction. In this embodiment, four cameras 84 are provided to take images of the four corners of the positive electrode 24 (the packaged positive electrode 20) or the negative electrode 30.

The control unit 160, as a detector, detects the positions of the positive electrode 24 and the negative electrode 30 based on the images taken by the cameras 84.

(Operation of Electrode Position Detection Device)

Next, description will be given of an operation of the electrode position detection device 200 (electrode position detection method) when detecting the positions of the positive electrode 24 and the negative electrode 30.

Figure 14:
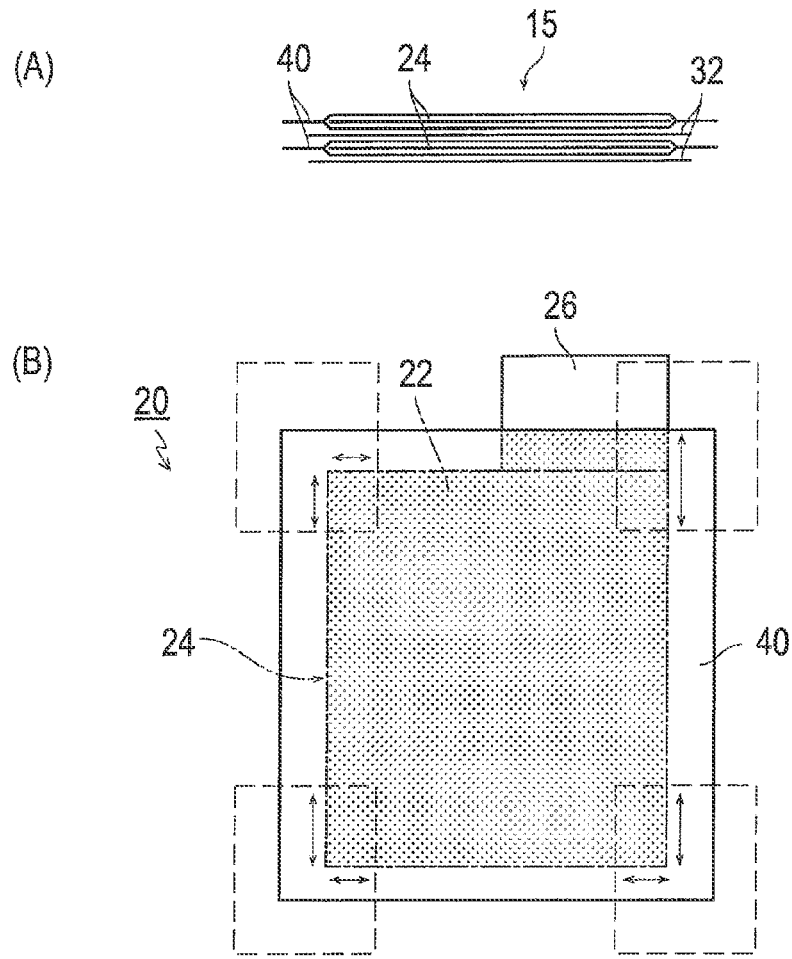
FIG. 14 is a conceptual view showing how to check the position of the positive electrode inside the packaged positive electrode.
Figure 15:
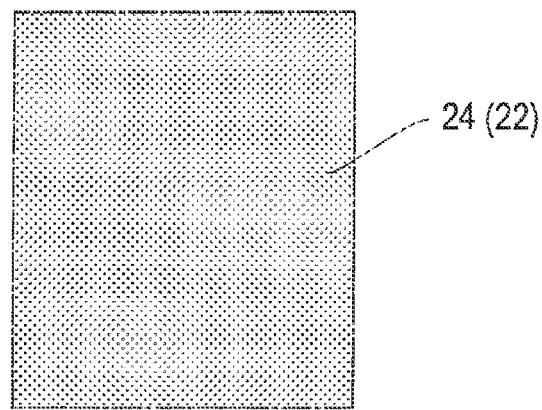
FIG. 15 is a conceptual view showing the positive electrode having positions of its sides specified.
Figure 16:
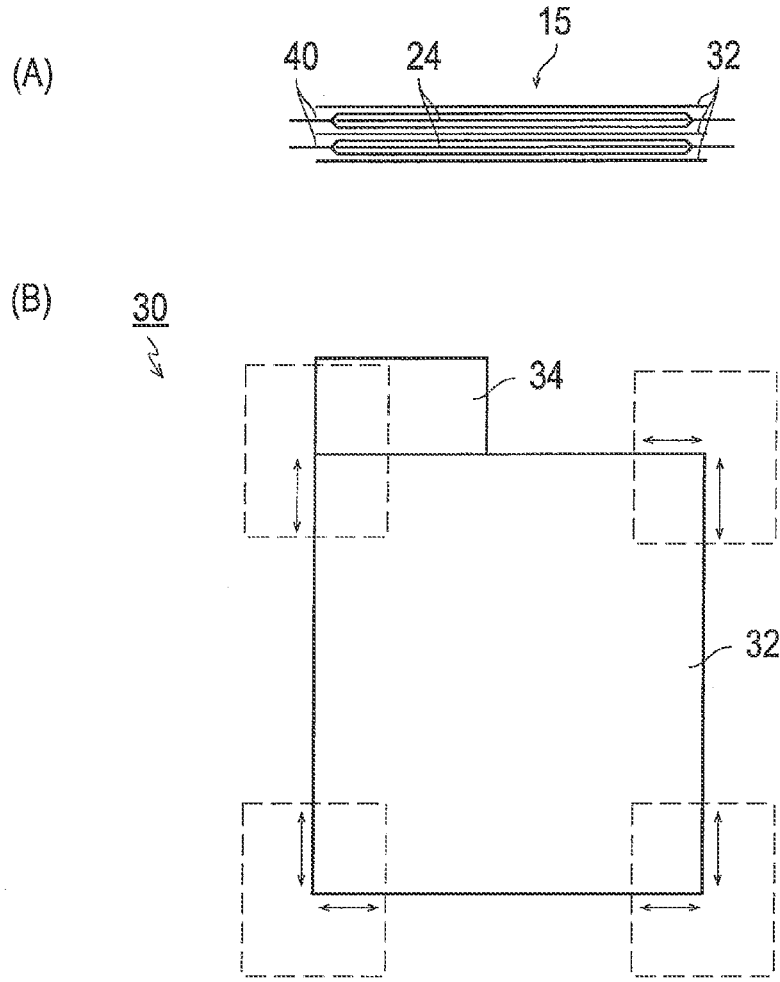
FIG. 16 is a conceptual view showing how to check the position of the negative electrode.
Figure 17:
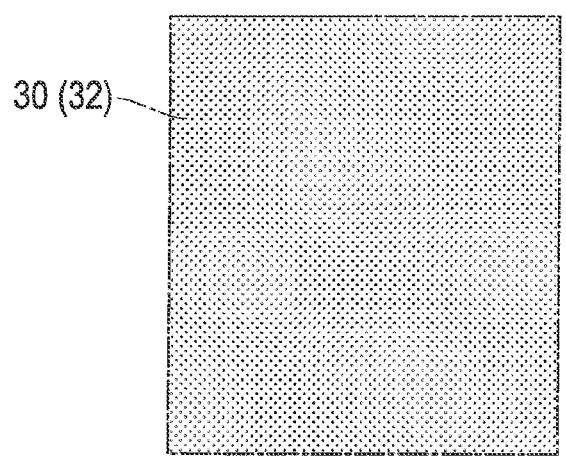
FIG. 17 is a conceptual view showing the negative electrode having positions of its sides specified.
Figure 18:
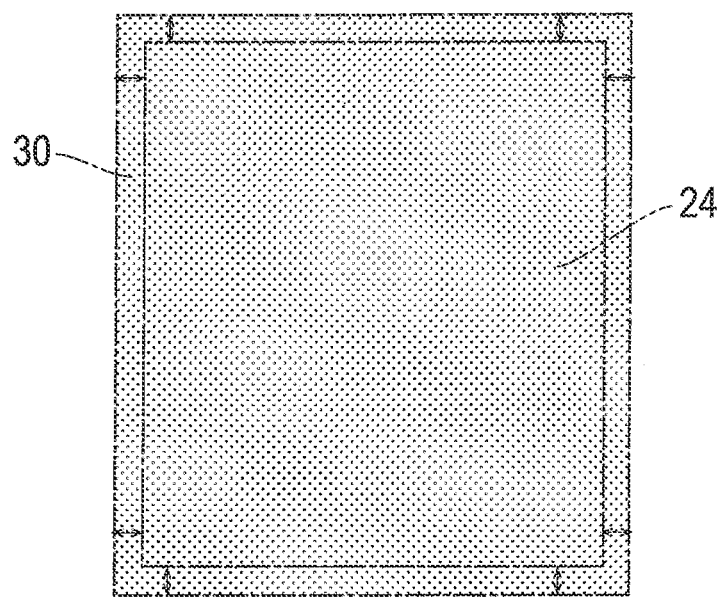
FIG. 18 is a conceptual view showing relative positions of the positive and negative electrodes.

FIG. 14 is a conceptual view showing how to check the position of the positive electrode inside the packaged positive electrode. FIG. 15 is a conceptual view showing the positive electrode having positions of its sides specified. FIG. 16 is a conceptual view showing how to check the position of the negative electrode. FIG. 17 is a conceptual view showing the negative electrode having positions of its sides specified. FIG. 18 is a conceptual view showing relative positions of the positive and negative electrodes. Note that FIG. 14(A) is a conceptual view of the stacked body seen from the front when checking the position of the positive electrode inside the packaged positive electrode. FIG. 14(B) is a conceptual plan view of the stacked body. FIG. 16(A) is a conceptual view of the stacked body seen from the front when checking the position of the negative electrode. FIG. 16(B) is a conceptual plan view of the stacked body.

On the stacking stage 140, the packaged positive electrodes 20 and the negative electrodes 30 are alternately stacked by the sheet stacking device 100. The electrode position detection device 200 projects light from the light sources 76 onto the packaged positive electrode 20 and the negative electrode 30 on the uppermost layer of the stacked body 15.

When the packaged positive electrode 20 is stacked on the uppermost layer of the stacked body 15 as shown in FIG. 14(A), the electrode position detection device 200 projects light from the light sources 76 onto the packaged positive electrode 20. The projected light penetrates the separator 40 of the packaged positive electrode 20 and is reflected by the positive electrode 24. The cameras 84 receive the reflected light through the positive electrode 24. The four cameras 84 take images of regions indicated by the dotted lines in FIG. 14(B), for example. When the images within the regions indicated by the dotted lines are obtained, the control unit 160 analyzes the images to specify a part of each side of the positive electrode 24 within a range indicated by the double-headed arrows in FIG. 14(B). The control unit 160 extends the specified part of each side of the positive electrode 24 to specify the position of each side of the positive electrode active material layer 22 that is a coating portion of the positive electrode 24. Thus, the positions of the specified sides are expressed in a rectangular shape as shown in FIG. 15. Then, positional information on the specified sides of the positive electrode active material layer 22 is stored in the storage unit 150 as information indicating the position of the positive electrode 24. Note that the cameras 84 can also similarly specify the position of the separator 40 by shooting images of the packaged positive electrode 20 in a state of no light from the light sources 76. Then, positional information on the specified sides of the separator 40 may also be stored in the storage unit 150. Thus, a relative position of the positive electrode 24 to the separator 40 can also be specified. Note that a part of the projected light penetrates the separator 40 in an outer peripheral portion of the positive electrode 24, further penetrates the separator 40 and then is reflected by the negative electrode 30. In this case, although the cameras 84 receive the reflected light, the received light is weaker than that when the cameras 84 receive the light reflected by the positive electrode 24. Thus, images taken by the cameras are paler than those in the case of the positive electrode 24. Therefore, clear comparison between the negative electrode 30 and the positive electrode 24 can be made based on the state of the images.

Subsequently, when the negative electrode 30 is stacked on the uppermost layer of the stacked body 15 as shown in FIG. 16(A), the electrode position detection device 200 projects light from the light sources 76 onto the negative electrode 30. The projected light is reflected by the negative electrode 30. The cameras 84 receive the reflected light through the negative electrode 30. The four cameras 84 take images of regions indicated by the dotted lines in FIG. 16(B), for example. When the images within the regions indicated by the dotted lines are obtained, the control unit 160 analyzes the images to specify a part of each side of the negative electrode 30 within a range indicated by the double-headed arrows in FIG. 16(B). The control unit 160 extends the specified part of each side of the negative electrode 30 to specify the position of each side of the negative electrode active material layer 32 that is a coating portion of the negative electrode 30. Thus, the positions of the specified sides are expressed in a rectangular shape as shown in FIG. 17. Then, positional information on the specified sides of the negative electrode active material layer 32 is stored in the storage unit 150 as information indicating the position of the negative electrode 30. Note that the cameras 84 can also specify the position of the separator 40 by shooting the edges of the packaged positive electrode 20 stacked below the negative electrode 30 in a state of no light from the light sources 76. Since the separator 40 is larger than the negative electrode 30, only the edges of the separator can be shot by the cameras 84 even when the negative electrode 30 is stacked thereon. Then, positional information on the sides of the separator 40 specified by the shooting may also be stored in the storage unit 150. Thus, a relative position of the negative electrode 30 to the separator 40 can also be specified.

The control unit 160 sequentially detects the positions of the positive electrode 24 and the negative electrode 30 (the relative position of the positive electrode 24 to the separator 40 and the relative position of the negative electrode 30 to the separator 40) as described above, and then sequentially stores the detected positions in the storage unit 150. Upon completion of the stacked body 15 as the battery element or during the stacking of the stacked body 15, the control unit 160 determines whether or not there is a stacking displacement between the negative electrode 30 and the positive electrode 24.

Upon determination of a stacking displacement, the control unit 160 reads the positional information on the sides of the positive electrode 24 and the negative electrode 30 from the storage unit 150 to detect a relative positional relationship between the both electrodes. In the detection, the specified positions of the positive electrode 24 and the negative electrode 30 in FIGS. 15 and 17 are overlapped. FIG. 18 is a conceptual view showing the overlapped positions. Then, the control unit 160 analyzes the result of the overlapping to determine the relative positional relationship between the positive electrode 24 and the negative electrode 30. To be more specific, the control unit 160 identifies the positions of the sides of the positive electrode 24 and the negative electrode 30 and checks if the corresponding sides are within a predetermined range. For example, when the positive electrode 24 is smaller than the negative electrode 30 within a range overlapping with the separator 40, it is checked if the respective sides of the positive electrode 24 are on the inner side of the respective sides of the corresponding negative electrode 30. Then, when all the sides of the positive electrode 24 are on the inner side of those of the negative electrode 30, it is determined that there is no stacking displacement. Not only whether the sides are on the inner side or outer side but also a distance between the sides may be calculated to determine a stacking displacement based on a range of the distance.

As described above, in this embodiment, the positions of the positive electrode 24 and the negative electrode 30 are detected, and thus the relative positional relationship between the positive electrode 24 and the negative electrode 30 is detected. Therefore, a stacking displacement can be determined based on the detected relative positional relationship between the positive electrode 24 and the negative electrode 30. As a result, it is possible to prevent shipping of the power generation element 15 with a stacking displacement between the negative electrode 30 and the positive electrode 24. Since the relative positions are detected by specifying the sides of the positive electrode active material layer 22 and the negative electrode active material layer 32, which have particular impact on battery performance, inspection can be made from the viewpoint of influence of the stacking displacement on substantial battery performance.

The stacking displacement is determined based on whether or not the positive electrode 24 is positioned on the inner side of the negative electrode 30. Thus, the stacking displacement can be determined through an easy determination process.

Next, the wavelength of the light to be projected will be described.

Figure 19:
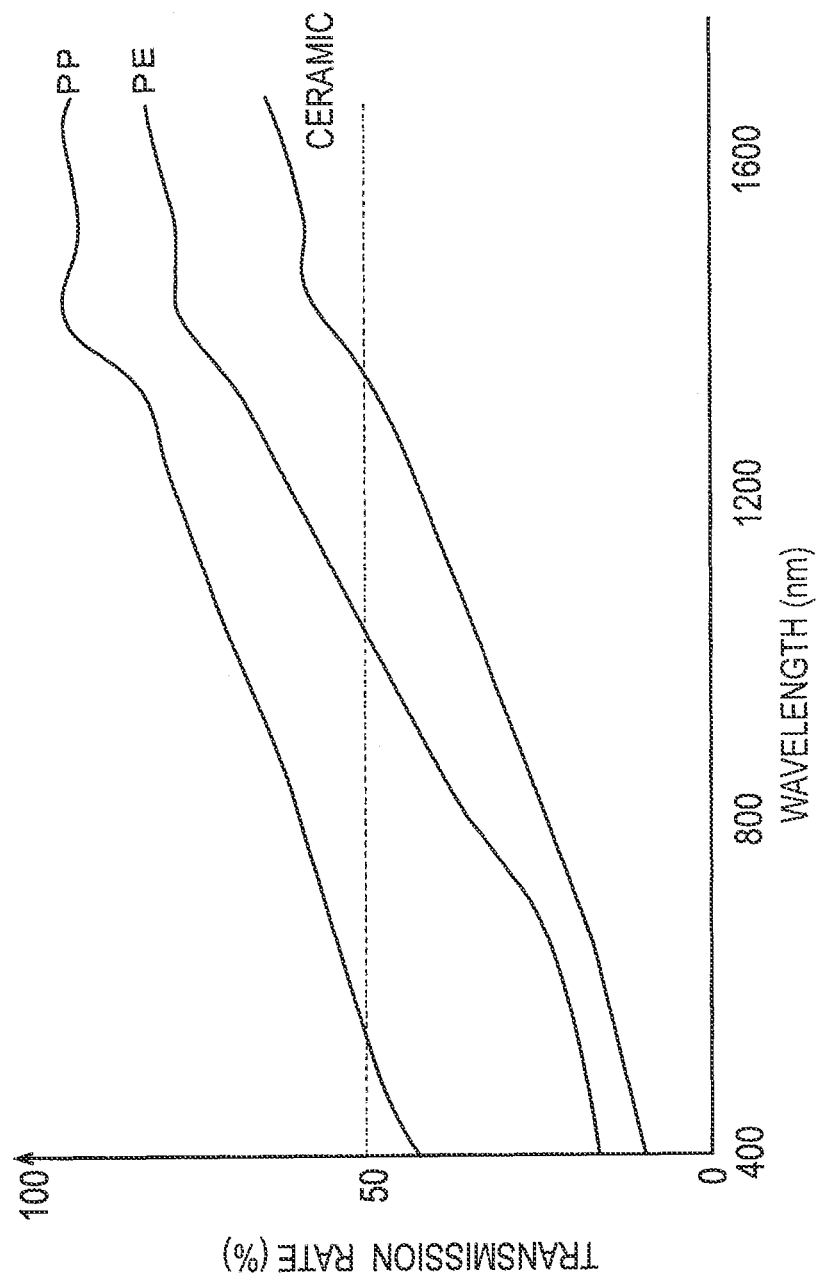
FIG. 19 is a schematic view showing transmission characteristics of a separator.
Figure 20:
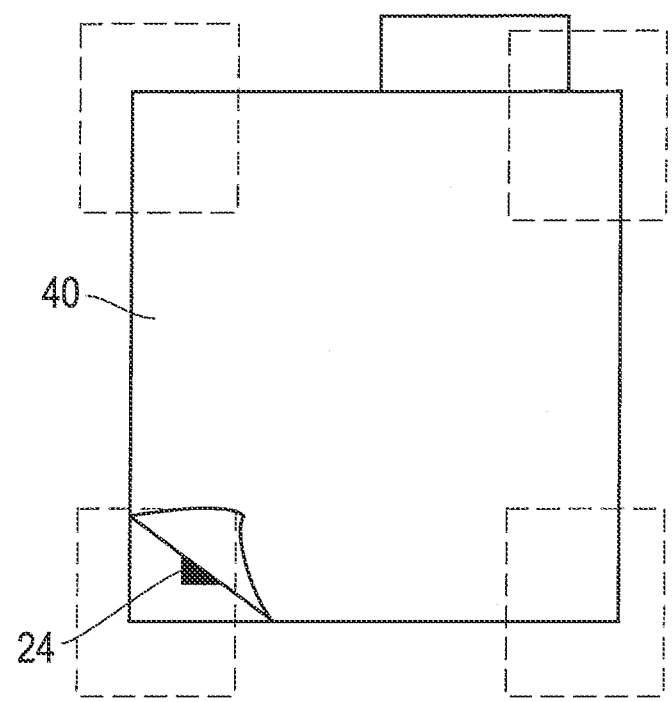
FIG. 20 is a schematic view showing an example of a situation where the separator is peeled off.

FIG. 19 is a schematic view showing transmission characteristics of the separator. In FIG. 20, the horizontal axis indicates the wavelength (nm) of the light and the vertical axis indicates the transmission rate (%) of the light.

FIG. 19 shows transmission characteristics of three kinds of separators, i.e., a polypropylene separator, a polyethylene separator and a ceramic separator. The polypropylene separator and the polyethylene separator are polymer backbones made of polypropylene and polyethylene, respectively. Also, the ceramic separator is obtained by coating a polypropylene base material with a porous film formed by bonding of a binder and ceramic particles such as silica, alumina, zirconium oxide and titanium oxide.

With reference to FIG. 19, the tendency of transmission varies depending on the material of the separator 40. However, it is clear that, for any material, the longer the wavelength of the light, the higher the transmission rate. In the above embodiment, the light of the wavelength that penetrates the separator needs to be projected from the light source 70 for detection of the positive electrode 24. Although it depends on the sensitivity of the camera 80, it is preferable that light of a wavelength that penetrates the separator at least at a transmission rate of 50% or more is projected from the light source 70. When the transmission rate is 50% or more, the light can be surely transmitted through the separator 40 to detect the positive electrode 24.

Note that the positive electrode 24 is made of metal such as aluminum or copper, and thus transmits hardly any light. Therefore, there is no particular upper limit on the wavelength as long as the wavelength is not less than one that penetrates the separator 40.

As described above, the wavelength of the light to be projected can be set based on the transmission rate for the separator 40 regardless of the material of the separator 40. More specifically, the lower limit of the wavelength can be set based on the transmission rate (50% or more) for the separator 40.

When a ceramic separator having the transmission characteristics shown in FIG. 19, for example, is adopted, light of a wavelength of about 1300 nm or more, e.g., near-infrared light can be used. While light is less likely to penetrate the ceramic separator compared with the polypropylene separator or the polyethylene separator, the near-infrared light can penetrate the ceramic separator.

Modified Example

In the above embodiment, the description has been given of the configuration in which the positive electrode 24 is packaged between the separators 40 as the packaged positive electrode 20. However, the negative electrode 30 may be packaged. In this case, light is transmitted through the separator to detect the position of a negative electrode in a packaged negative electrode as a packaged electrode.

Also, in the above embodiment, the relative positions are specified based on the positions of the sides of the positive electrode 24 and the negative electrode 30. However, the specification of the relative positions of the positive electrode 24 and the negative electrode 30 is not limited thereto. For example, coordinates of four corners may be calculated from the positions of the sides of the positive electrode 24 and the negative electrode 30 to obtain center positions thereof from the average position of the corners, and the relative positions of the positive electrode 24 and the negative electrode 30 may be detected based on relative positions of the center positions.

In addition, in the above embodiment, the light sources 76 and the cameras 84 are used to detect the positions of the positive electrode 24 and the negative electrode 30. However, the light sources 76 and the cameras 84 may be used to detect the position of the separator 40. As described above, each of the light sources 76 irradiates light that penetrates the separator 40 at the transmission rate of 50% or more, for example. When the transmission rate is not 100%, some of the light is reflected by the separator 40. The position of the separator 40 can also be detected by the cameras 84 detecting the reflected light. Since the cameras 84 face the four corners, the overall length of the separator can be detected from a part of each side thereof in the vicinity of the corners, as in the case of the positive electrode 24 and the negative electrode 30.

Moreover, in the above embodiment, the four cameras 84 are installed. However, only one camera may be installed, for example, if the camera has a wide field of view.

Furthermore, in the above embodiment, the description has been given of the case where the negative electrode 30 is larger than the positive electrode 24 within the range overlapping with the separator 40. However, the positive electrode 24 may be larger than the negative electrode 30.

Also, in the above embodiment, the description has been given of the case where the positive-electrode lead 11 and the negative-electrode lead 12 are extended from the same end of the exterior member 13 as shown in FIG. 1. However, the present invention is not limited thereto. The positive-electrode lead 11 and the negative-electrode lead 12 may be extended from the opposite ends. In this case, in formation of the power generation element 15 of the secondary battery 10, the negative electrode 30 and the packaged positive electrode 20 are stacked so that the tab portions 26 and 34 face opposite directions to each other.

Moreover, although the light of the wavelength that is reflected by the positive electrode 24 and the negative electrode 30 is projected in the above embodiment, light of a wavelength that is absorbed by the positive electrode 24 and the negative electrode 30 may be projected. In this case, the cameras 84 take images of a range that appears black due to absorption of the light. The control unit 160 detects the range that appears black as the position of the positive electrode 24 or the negative electrode 30 in the uppermost layer.

(Separator Peel-Off Detection)

FIG. 20 is a schematic view showing an example of a situation where the separator is peeled off.

In addition to the above embodiment, it may also be determined whether or not the separator 40 is normal.

In this case, a new light source is added above the stacking stage 140. The light source to be added irradiates light that is reflected by the separator 40 by 50% or more, for example. The new light source projects the light onto the packaged positive electrode 20. The projected light is reflected by the separator 40. The cameras 84 can receive the reflected light through the separator 40 and take an image of the separator 40. Accordingly, it can also be determined whether or not the separator 40 is normal, based on the result of the taken image of the separator 40 itself.

The control unit 160 can detect that the separator 40 is not normal when the lower left corner of the separator 40 is peeled off as shown in FIG. 20.

The occurrence of peel-off can be detected as follows. The control unit 160 allows the light sources 76 to irradiate light and the cameras 84 to receive light reflected by the separator 40. The control unit 160 analyzes images taken by the cameras 84 to distinguish the separator 40 that appears whitish from the positive electrode 24 that appears blackish. The positive electrode 24 is detected based on a difference in brightness between the images, for example. When the dark positive electrode 24 is detected in a range where the separator 40 should be present, it can be detected that the separator 40 is peeled off and the positive electrode 24 is exposed.

With the above configuration, a defect in the packaged positive electrode 20 can be more accurately detected while detecting the peel-off of the separator 40.

Note that the detection of the peel-off of the separator 40 can also be executed when shooting of the separator 40 is performed by the cameras 80 on the positive electrode feed table 120.

While the embodiments of the present invention have been described above, these embodiments are described for illustrative purposes only to facilitate the understanding of the present invention, and the present invention is not limited to the embodiments. The technical scope of the present invention is not limited to the concrete technical matters disclosed in the above embodiments and the like, but also encompasses various modifications, changes, alternative techniques, and the like which can be easily derived from this disclosure.

This application claims the priority based on Japanese Patent Application No. 2011-085791 filed on Apr. 7, 2011 and Japanese Patent Application No. 2012-067852 filed on Mar. 23, 2012; the entire contents of which are incorporated herein by reference.

INDUSTRIAL APPLICABILITY

The electrode position detection device and the electrode position detection method according to the present invention enable a relative positional relationship between the first and second electrodes to be detected while identifying the position of the first electrode hidden inside the bag-shaped separator, and thus enable determination of whether or not there is a stacking displacement based on the positional relationship.

REFERENCE SIGNS LIST 10 secondary battery
15 power generation element
20 packaged positive electrode
22 positive electrode active material layer
24 positive electrode
26 tab portion
30 negative electrode
32 negative electrode active material layer
34 tab portion
40 separator
42 joint portion
60, 62, 64 suction conveyor
70, 72, 74, 76 light source
80, 82, 84 camera
100 sheet stacking device
110 stacking robot
112 L-shaped arm
114, 116 suction hand
120 positive electrode feed table
122 XY stage
124 supporting stage
126 clamper
130 negative electrode feed table
132 XY stage
140 stacking stage
142 mounting part
144 drive part
146 clamper
150 storage unit
160 control unit
200 electrode position detection device

The invention claimed is:

1. An electrode position detection device configured to detect a relative positional relationship among a first electrode, a second electrode, and a separator when a packaged electrode and the second electrode are alternately stacked, the packaged electrode having the first electrode disposed inside the separator formed in a bag shape, the second electrode having a polarity different from that of the first electrode, the device comprising:
a projector configured to project light that penetrates and is reflected by the separator and is reflected by the first and second electrodes;
a light receiver configured to receive light projected from the projector and reflected by the first electrode included in the packaged electrode in the uppermost layer when the packaged electrode is positioned in the uppermost layer, and to receive light projected from the projector and reflected by the second electrode in the uppermost layer and light projected from the projector and reflected by the separator included in the packaged electrode stacked below the second electrode in the uppermost layer when the second electrode is positioned in the uppermost layer; and
a detector configured to detect the relative positional relationship among the first electrode, the second electrode and the separator, by specifying the position of the first electrode based on the result of the light reception by the light receiver when the packaged electrode is positioned in the uppermost layer, and by specifying the positions of the second electrode and the separator included in the packaged electrode stacked below the second electrode based on the result of the light reception by the light receiver when the second electrode is positioned in the uppermost layer.

2. The electrode position detection device according to claim 1, wherein the separator is a ceramic separator and the light to be projected from the projector is near-infrared light.

3. The electrode position detection device according to claim 2, wherein the projector projects near-infrared light having a wavelength of 1300 nm or more.

4. The electrode position detection device according to claim 1, wherein the detector determines whether or not one of the first and second electrodes is positioned on an inner side of the other within a range overlapping with the separator when seen in a stacking direction of the first and second electrodes.

5. An electrode position detection method for detecting a relative positional relationship among a first electrode, a second electrode, and a separator when a packaged electrode and the second electrode are alternately stacked, the packaged electrode having the first electrode disposed inside the separator formed in a bag shape, the second electrode having a polarity different from that of the first electrode, the method comprising:
a projection step of projecting light that penetrates and is reflected by the separator and is reflected by the first and second electrodes;
a first light reception step of receiving light projected in the projection step and reflected by the first electrode included in the packaged electrode in the uppermost layer when the packaged electrode is positioned in the uppermost layer;
a second light reception step of receiving light projected in the projection step and reflected by the second electrode in the uppermost layer and light projected in the projection step and reflected by the separator included in the packaged electrode stacked below the second electrode in the uppermost layer when the second electrode is positioned in the uppermost layer; and
a detection step of detecting the relative positional relationship among the first electrode, the second electrode and the separator, by specifying the position of the first electrode based on the result of the light reception in the first light reception step, and by specifying the positions of the second electrode and the separator included in the packaged electrode stacked below the second electrode based on the result of the light reception in the second light reception step.

6. The electrode position detection method according to claim 5, wherein the separator is a ceramic separator and the light to be projected in the projection step is near-infrared light.

7. The electrode position detection method according to claim 6, wherein, in the projection step, near-infrared light having a wavelength of 1300 nm or more is projected.

8. An electrode position detection device configured to detect a relative positional relationship among a first electrode, a second electrode, and a separator when a packaged electrode and the second electrode are alternately stacked, the packaged electrode having the first electrode disposed inside the separator formed in a bag shape, the second electrode having a polarity different from that of the first electrode, the device comprising:

means for projecting light that penetrates and is reflected by the separator and is reflected by the first and second electrodes;

means for receiving light projected from the means for projecting light and reflected by the first electrode included in the packaged electrode in the uppermost layer when the packaged electrode is positioned in the uppermost layer, and for receiving light projected from the means for projecting light and reflected by the second electrode in the uppermost layer and light projected from the means for projecting light and reflected by the separator included in the packaged electrode stacked below the second electrode in the uppermost layer when the second electrode is positioned in the uppermost layer; and means for detecting the relative positional relationship among the first electrode, the second electrode and the separator, by specifying the position of the first electrode based on the result of the light reception by the means for receiving light when the packaged electrode is positioned in the uppermost layer, and by specifying the positions of the second electrode and the separator included in the packaged electrode stacked below the second electrode based on the result of the light reception by the means for receiving light when the second electrode is positioned in the uppermost layer.

* * * * *